Patented Apr. 12, 1927.

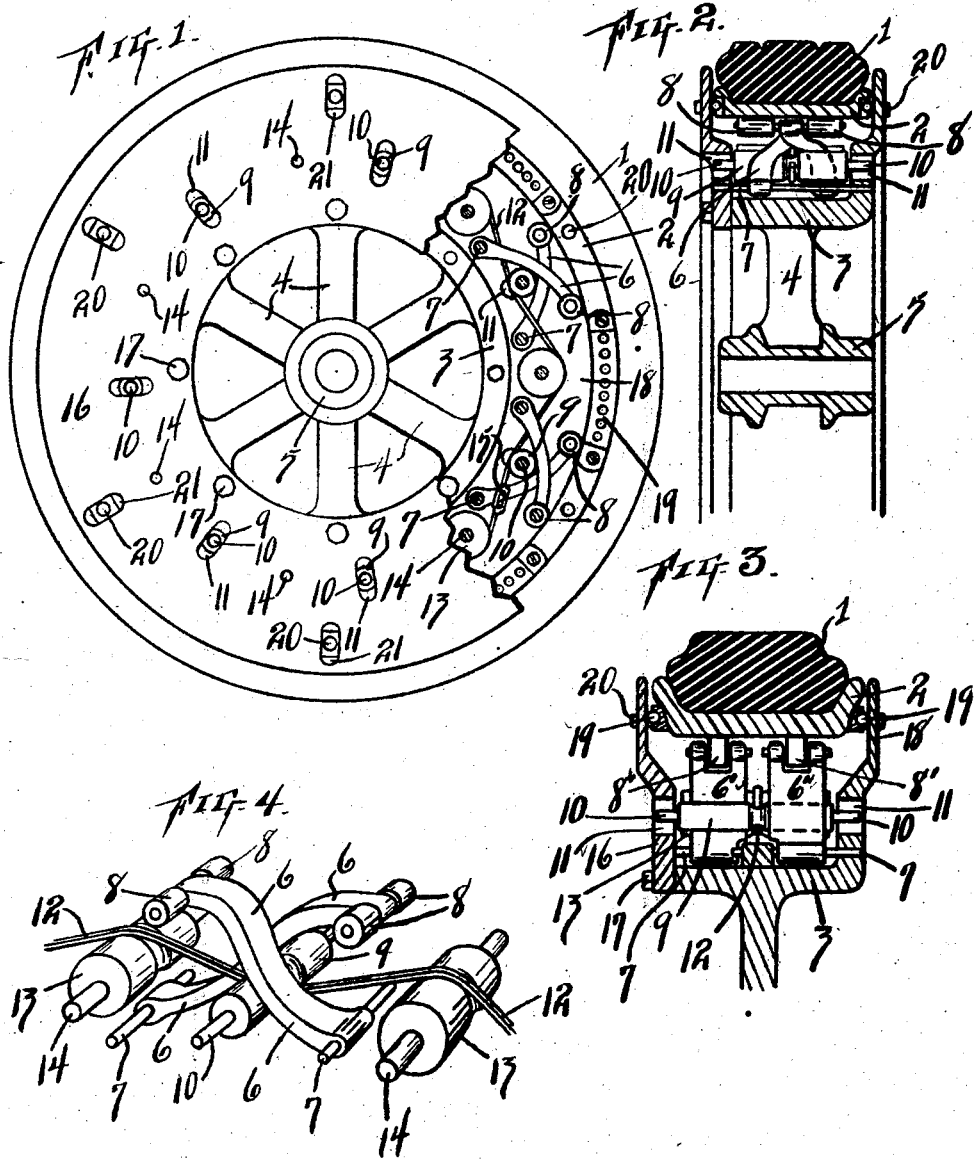

1,624,645

UNITED STATES PATENT OFFICE.

BERT WILKIRSON, OF FORT WORTH, TEXAS.

VEHICLE WHEEL.

Application filed July 28, 1926. Serial No. 125,537.

My invention relates to vehicle wheels and more particularly to means for making a yielding tread and for automatically restoring the tread to normal condition; and the object is to provide a wheel with a yielding tread and to provide simple means for making the tread yielding and for maintaining the tread in normal condition and for restoring the tread to normal condition after each yielding operation. Another object is to provide simple mechanism which will perform both functions, that is, permit the tread to yield and to restore the tread automatically to normal condition after the strain or load has been removed. Other objects and advantages will be fully explained in the following description and the invention will be more particularly pointed out in the claims.

Reference is had to the accompanying drawings which form a part of this application.

Fig. 1 is a side elevation of a wheel equipped with the improvements, one guard member being partly broken away.

Fig. 2 is a fragmentary transverse sectional view through the rim and hub.

Fig. 3 is a similar view, showing a variation.

Fig. 4 is a perspective view, showing in detail the operating mechanism illustrated in Figs. 1 and 2.

Similar characters of reference are used to indicate the same parts throughout the several views.

The wheel is provided with a tread 1 and a tread holder 2 and the tread and holder are adapted to move radially relative to the wheel. The wheel has a rim or felly 3 and a radial guard member 18 is formed on the felly and a similar guard member 16 is attached to the felly 3 by screw bolts 17. A ball race may be attached to the holder 2 for ball bearings 19 for decreasing friction of the holder against the guard members 16 and 18. The holder 2 is supported on arms 6 which are pivotally mounted on the rods 7 which are carried by the guard members 16 and 18. The arms 6 are provided with antifriction rollers 8 which bear against the inner periphery of the holder 2. The antifriction bearings 19 are arranged in groups, as shown in Fig. 1. Means are provided for preventing peripheral movement of the holder 2 relative to rollers 8 and the guard members 16 and 18. The holder 2 is provided with studs 20 and the guard members 16 and 18 are provided with radial slots 21 to permit limited radial movement of the holder 2.

The arms 6 bear against the rollers 9 which are yieldable radially by reason of a cord or cable 12. The rollers 9 are provided with shafts 10 which project through slots 11 in the members 18 and 16. The slots 11 are radially disposed. The cord or cable 12 is supported on rollers 13 which are provided with shafts 14 which are journaled in guard members 16 and 18. When pressure is exerted inwardly on a pair of rollers 8, the pressure is transmitted through arms 6 on the rollers 9. The pressure will be on only one roller at a time and this roller will press on the cable 12. In order for cable 12 to yield, this cable must press all the other rollers outwardly. This action provides yielding action for the pair of rollers 8 which are being pressed inwardly by the rim or tread holder 2. The wheel has a hub 5 and spokes of ordinary type. The guard members 16 and 18 have annular interior shoulders to limit the inward movement of the tread-holder. The outer ends of arms 6' lie in parallel planes, whereas those of arms 6 lie in a common central plane. The outer end of each arm 6' is bifurcated with a spindle connecting the bifurcated parts and a roller 8' seated thereon between said parts, whereas the outer end of each arm 6 is not bifurcated and two rollers 8 are seated on the opposite ends of a spindle extending transversely through same and projecting therefrom on opposite sides thereof.

What I claim, is,—

1. A vehicle wheel comprising a felly, guard members rigid with said felly and projecting radially outward, a tread and a holder therefor mounted between said guard members and provided with antifriction bearings, pivoted arms bearing against the inner periphery of said holder, and yielding means permitting inward movement of said swinging arms and forcing said arms outwardly when the pressure is relieved.

2. A vehicle wheel having a felly, guard members rigid with said felly and projecting radially outward and provided with annular interior shoulders, a tread and a holder therefor mounted between said guard members and provided with antifriction bearings, said shoulders being adapted to limit the inward thrust of said holder, yielding swinging arms provided with rollers bearing against the inner periphery of said holder, and means for controlling the inward and outward movement of said swinging arms.

In testimony whereof, I set my hand, this 24th day of July, 1926.

BERT WILKIRSON.